S. BEACH & M. JOHNSON.
Animal Cage-Traps.
No. 147,091.
Patented Feb. 3, 1874.
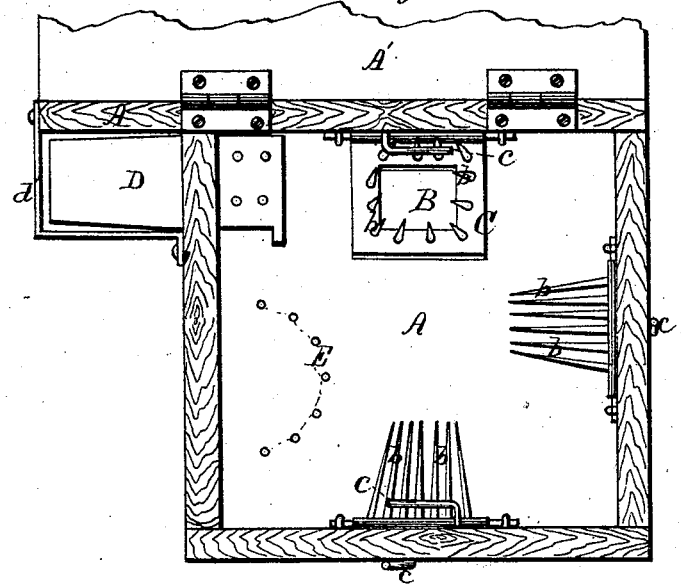
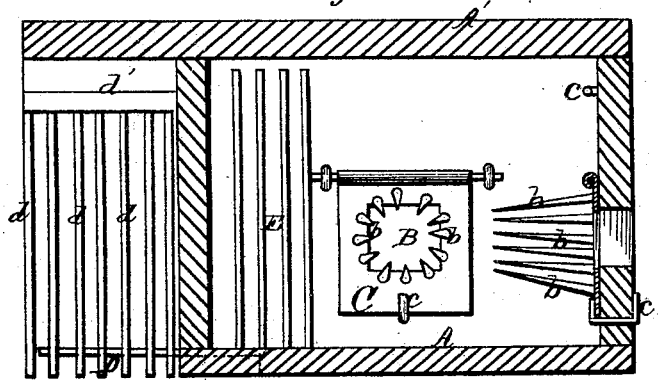

UNITED STATES PATENT OFFICE.

STEPHEN BEACH AND MATHIAS JOHNSON, OF MEADVILLE, MISSOURI.

IMPROVEMENT IN ANIMAL CAGE-TRAPS.

Specification forming part of Letters Patent No. 147,091, dated February 3, 1874; application filed July 14, 1873.

*To all whom it may concern:*

Be it known that we, STEPHEN BEACH and MATHIAS JOHNSON, of Meadville, in the county of Linn and State of Missouri, have invented a new and useful Improvement in Animal-Traps, of which the following is a full, clear, and exact description, reference being had to the annexed drawings, and in which—

Figure 1 represents a plan view of our trap, showing one of the hinged frames with convergent bars, and disposed upon the interior of the trap, around the animal-entrances, in an elevated position; and Fig. 2 is a vertical section thereof.

In the designation of identical parts in the two figures corresponding letters of reference are used.

This invention relates to certain improvements in animal-traps of that class which, after the animal has been caught, precipitates it into a vessel of water or some other liquid for destroying the life thereof; and it consists of hinged frames disposed upon the interior of the trap and around the animal-entrances, they being supplied with bars arranged around their openings, and converging at their inner or free ends, which are sharpened, and of certain other elements, to be hereinafter described.

To enable others to make and use our invention, we will proceed to describe it.

In the drawing, A refers to a receptacle or box, one side of which is elongated, or made to protrude beyond the box, and has the cover A' attached to it, which cover is of the same length as the said side of the box, the object of which will be seen hereinafter. B B are the animal-entrances. C C refer to metallic frames, which are hinged to the interior of the box A and around the animal-entrances B B, and supplied with bars $b\ b$, arranged around the openings in said frames, and converging at their free or sharpened ends, so as to debar the return of the animal after entering the trap. Swivels or angular levers $c\ c$ are supplied to the box A, above and below the hinged frames C C, for the respective purposes of holding the said frames in an elevated position, and of securing them down in place. By hinging the frames, and providing the swivels or angular levers operating in conjunction therewith, the said frames can be placed in an elevated position, and held in such position, so as to allow the animals to pass in and out of the trap through the entrance B, with a view of alluring them to enter the trap, which having been accomplished, the frames are lowered, and the animals, entering as usual, will be entrapped, the pointed or sharpened and convergent bars $b\ b$ affixed thereto preventing their return or escape through the said entrances. D is a tilting platform or leaf pivoted in an opening in one end of the box A, and having its outer or lighter end guarded on one side by the elongated side of the said box, and its opposite side and end by a series of wires or bars, $d\ d$, depending from an angular metallic plate, $d'$, fastened in any known way to the protruding side and one end of the box A, as shown in Fig. 1.

The animal, by reason of the inclosure thus formed around the tilting platform, will be prevented from leaping or jumping therefrom, and consequently must go down as the platform tilts, and will be precipitated into a vessel filled with water or other liquid.

The cover or lid A' is, as above intimated, of sufficient size to cover the top of the said inclosure, and thus prevent any possibility of escape by the animal at this point.

E refers to the feeder, which consists of a series of vertical bars arranged in the floor of the trap semicircularly, and in view of one of the animal-entrances. The feeder, as indicated by its name, is to receive the bait or food for attracting the animal.

Having thus described our invention, what we claim, and desire to secure by Letters Patent, is—

1. The hinged metallic frame C C, located upon the interior of the trap and around the animal-entrances, and having the converging bars $b\ b$, in combination with the swivels or angular levers $c\ c$, substantially as and for the purpose set forth.

2. In an animal-trap, the tilting platform D, the tilted or unweighted end of which protrudes beyond the trap, and is provided with an inclosure, A $d\ d'$, substantially as shown and described, and for the purpose set forth.

In testimony whereof we have hereunto signed our names this 7th day of July, 1873, in presence of two subscribing witnesses.

STEPHEN BEACH.
MATHIAS JOHNSON.

Witnesses:
J. M. THOMPSON,
M. MOORE.